US006839521B2

(12) United States Patent
Davis

(10) Patent No.: US 6,839,521 B2
(45) Date of Patent: Jan. 4, 2005

(54) PHOTONIC BIPOLAR MODEM FOR SECURE MULTI-CHANNEL COMMUNICATION

(75) Inventor: Richard L. Davis, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 440 days.

(21) Appl. No.: 09/852,556

(22) Filed: May 10, 2001

(65) Prior Publication Data

US 2002/0176140 A1 Nov. 28, 2002

(51) Int. Cl.[7] .............................................. H04B 10/18

(52) U.S. Cl. ...................... 398/156; 398/154; 398/161

(58) Field of Search .............................. 398/140, 141, 398/154, 156, 158, 161, 172, 185, 186, 187, 189

(56) References Cited

U.S. PATENT DOCUMENTS

| | | | |
|---|---|---|---|
| 4,494,228 A | 1/1985 | Gutleber | |
| 4,901,307 A | 2/1990 | Gilhousen et al. | |
| 5,416,884 A | 5/1995 | Hirata et al. | |
| 5,678,935 A | 10/1997 | Sakata | |
| 5,841,930 A | 11/1998 | Kovacic et al. | |
| 5,849,673 A | 12/1998 | Simon et al. | |
| 5,891,748 A | 4/1999 | Sakata | |
| 5,917,981 A | 6/1999 | Kavacic et al. | |
| 5,103,459 A | 7/1999 | Gilhousen et al. | |
| 6,025,944 A | 2/2000 | Mendez et al. | |
| 6,167,024 A | 12/2000 | Upton et al. | |
| 6,185,246 B1 | 2/2001 | Gilhousen | |
| 6,628,864 B2 * | 9/2003 | Richardson et al. | 385/37 |
| 2002/0163696 A1 * | 11/2002 | Huang et al. | 359/154 |

OTHER PUBLICATIONS

"New architecture for incoherent optical CDMA to achieve bipolar capacity"; Zaccarin et al.; Electronics Letters, vol. 30, Issue 3, Feb. 3, 1994; pp.: 258–259.*
Mendez et al., "Synthesis and Demonstration of High Speed, Bandwidth Efficient Optical Code Division Multiple Access (CDMA) Tested at 1 Gb/s Throughput", IEEE Photonics Technology Letters, vol. 6, No. 9, Sep. 1994.
Hickernell, "dc Triode Sputtered Zinc Oxide Surface Elastic Wave Transducers", Journal of Applied Physics, vol. 44, No. 3, Mar. 1973.
Davis et al., "Low–loss Waveguides on Silicon Substrates for Photonic Circuits", SPIE vol. 1474, Optical Technology for Signal Processing Systems (1991).
Alferness et al., "Tunable Electro–optic Waveguide TE<–> TM Converter/Wavelength Filter", Applied Physics Letter 40(10), May 15, 1982.
Mendez et al. "Synthesis and Demonstration of High Speed, Bandwidth Efficient Optical Code Division Multiple Access (CDMA) Tested at Gb§ Throughput" *IEEE Photonics Technology Letters*, vol. 6, No. 9, Sep. 1994.

* cited by examiner

*Primary Examiner*—Jason Chan
*Assistant Examiner*—Nathan Curs
(74) *Attorney, Agent, or Firm*—Katten Muchin Zavis Rosenman; John S. Paniaguas

(57) ABSTRACT

A photonic arbitrary waveform modem utilizes a bipolar coding scheme. The bipolar coding scheme includes an arbitrary waveform modem which includes a plurality of tapped delay lines and is implemented by partitioning each optical frequency chip into positive and negative segments. Signals are decoded by effectively multiplying the transmit and receive code vectors and individually summing the positive and negative tap weights. The positive and negative tap weights are differenced to recreate the transmitted signal. The bipolar coding scheme allows for the use of truly orthogonal codes which decreases the interference and reduces the probability of detection.

3 Claims, 10 Drawing Sheets

PHOTONIC BIPOLAR MODEM FOR SECURE MULTI-CHANNEL COMMUNICATION

CROSS-REFERENCE TO RELATED APPLICATIONS

This application is related to commonly-owned copending patent application entitled "Arbitrary Waveform Modem", Ser. No. 09/120,851, filed on Jul. 22, 1998, now U.S. Pat. No. 6,396,801.

This invention was made with Government support under U.S. Government Contract No. N66001-99-C-8607, awarded by the United States Navy. The Government has certain rights in this invention.

BACKGROUND OF THE INVENTION

1. Field of the Invention

The present invention relates to a communication system and more particularly to a photonic arbitrary waveform modem for use in various applications including secure multiple access communication systems which utilizes bipolar encoding to provide true orthogonal coding to reduce co-channel interference.

2. Description of the Prior Art

Multiple access communication systems are generally known in the art and are used in various applications, such as cellular telephone communication systems. Various multiple access communication systems are known, for example, frequency division multiple access (FDMA), time division multiple access (TDMA) and code division multiple access (CDMA) systems are known. In FDMA communication systems, the frequency band is partitioned into a number of channels. Each user is temporarily assigned a channel, for example, for the duration of a call. In TDMA communication systems, each user is assigned a time slot in a frame and each call is time division multiplexed according to the user's assigned time slot.

In order to further improve the system capacity, CDMA communication systems have been developed. Examples of CDMA communication systems are disclosed in U.S. Pat. Nos. 4,494,228; 4,901,307; 5,103,459; 6,185,246; and commonly-owned U.S. Pat. No. 6,167,024. Such CDMA communication systems are also disclosed in "Synthesis and Demonstration of High Speed, Bandwidth Efficient Optical Code Division Multiple Access (CDMA) Tested at 1 Gb/s Throughput" by Mendez, et al. *IEEE Photonics Technology Letters*, Vol. 6, No. 9, September 1994, pages 1146–1149, all hereby incorporated by reference.

In such CDMA communication systems, a code, known as a Walsh code, is assigned to a user at the beginning of each communication and multiplied by each databit in the signal to be transmitted (i.e. digital bit stream), effectively spreading the signal over a wider frequency band, thus forming a direct sequence spread spectrum communication system. In such CDMA communication systems, all users effectively use the same timeslot and frequency band. Interference between users is prevented by selection of orthogonal Walsh codes. An advantage of spread spectrum communication techniques, such as CDMA, is the relatively low probability that the communication signals will be intercepted and detected.

In order to further increase the security in military communication systems, an arbitrary waveform modem has been developed that is characterized by non-periodic or chaotic waveforms. The arbitrary waveform modem is described in detail in commonly-owned copending U.S. patent application Ser. No. 09/120,851, filed on Jul. 22, 1998, hereby incorporated by reference and illustrated in FIGS. 1 and 2. In particular, FIG. 1 illustrates an arbitrary waveform modem transmitter, while FIG. 2 illustrates an arbitrary waveform receiver. As will be discussed in more detail below, the arbitrary waveform modem provides the ability to select infinitely variable tap spacings through the use of fiber optic Bragg gratings. It also enables the generation of an arbitrary waveform with relatively long symbol times, large bandwidths and non-uniform tap spacing which allows the modulated waveform to be any shape necessary. Since the modem can generate non-uniform tap spacings, the phasing of the chip, baud or symbol can be arbitrarily set to any value to produce a waveform characteristic that degenerates the rate line spectral components making interception improbable. Additionally, co-channel interference is reduced because the cross-correlation between orthogonally selected waveforms diminishes.

In general, the photonic arbitrary waveform modem modulates a signal waveform (e.g. digital bit stream) onto an optical carrier that is derived from a broadband source, for example, a super-luminescent diode (SLD). The various optical frequency components or chips are time delayed by differing amounts by a set of narrow band Bragg grating filters before being transmitted. At the receiver, another set of Bragg grating filters temporally realigns all of the frequency chips providing an increase in the signal-to-noise ratio that is equal to the number of chips in the code which enables recovery of the signals.

One major shortcoming of the photonic arbitrary waveform modem is that it relies on the direct summation of optical intensities which restricts the system to a set of unipolar codes (i.e. each tap weight can take on a value of 0 or 1). For a given number of wavelength taps, this places a limitation on the number of codes that can be generated that offer a high degree of orthogonality while providing reasonable processing gain. For example, for a case for which there are 16 taps, the Mendez article, discussed above, indicates that an optimum set of 16 pseudo-orthogonal code words can be constructed by utilizing various combinations of 5 taps. These codes produce an autocorrelation value of 5 and cross correlation values of either 1 or 2. Thus, there is a need for a photonic arbitrary waveform modem which increases the number of codes that can be generated to provide optimum efficiency of spectral occupancy while at the same time provide low co-channel interference modulation characteristics.

SUMMARY OF THE INVENTION

Briefly, the present invention relates to a photonic arbitrary waveform modem that utilizes a bipolar coding scheme. The bipolar coding scheme includes an arbitrary waveform modem which includes a plurality of tapped delay lines and is implemented by partitioning each optical frequency chip into positive and negative segments. Signals are decoded by effectively multiplying the transmit and receive code vectors and individually summing the positive and negative tap weights. The positive and negative tap weights are differenced to recreate the transmitted signal. The bipolar coding scheme allows for the use of truly orthogonal codes, which decreases the interference and reduces the probability of detection.

DESCRIPTION OF THE DRAWINGS

These and other advantages of the present invention will be readily understood with reference to the following specification and attached drawing wherein.

DETAILED DESCRIPTION

The present invention relates to a bipolar coding scheme for an arbitrary waveform modem as described in detail in commonly-owned co-pending U.S. patent application Ser. No. 09/120,851, filed on Jul. 22, 1998. In order to prevent drift of the tap weights due to temperature drifts of the tapped delay lines and other factors, a closed servo loop may be provided for each tap weight. The closed servo loop is described in detail in commonly-owned U.S. Pat. No. 6,167,024, hereby incorporated by reference.

Figure 3:
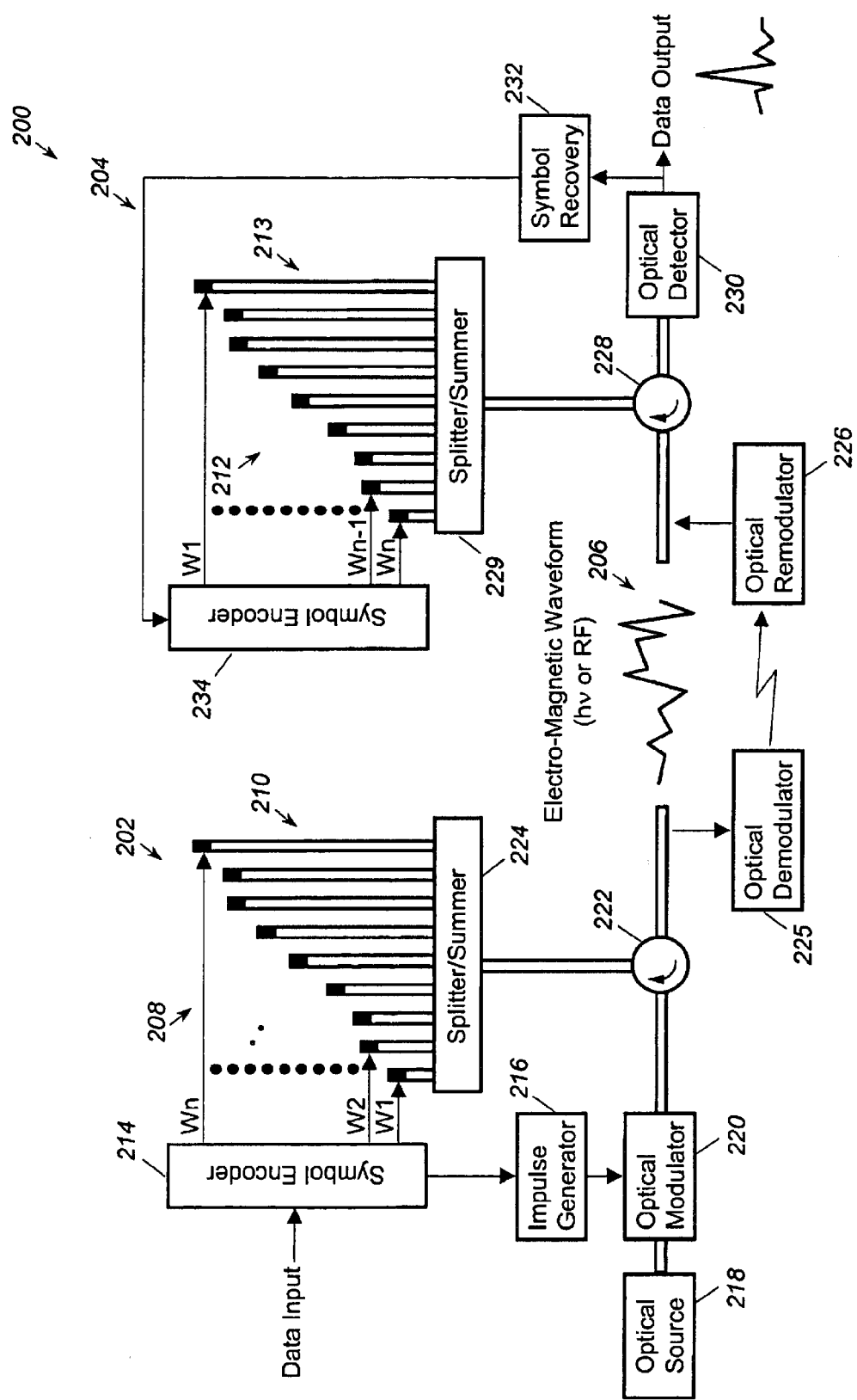
FIG. 3 is a more detailed block diagram of the known arbitrary waveform modem for use with the present invention.

In order to fully understand the invention, a detailed description of the unipolar arbitrary waveform modem is described and illustrated in connection with FIG. 3. The bipolar arbitrary waveform modem in accordance with the present invention is described and illustrated in connection with FIGS. 4–6. Exemplary bipolar codes for the bipolar arbitrary waveform modem are illustrated in FIGS. 7A and 7B. Finally, FIGS. 8A–10B illustrate a waveguide for use with the bipolar arbitrary waveform modem illustrated in FIGS. 4–6.

Unipolar Arbitrary Waveform Modem

An arbitrary or chaotic waveform modem as described and illustrated in co-pending commonly owned patent application Ser. No. 09/120,851, filed on Jul. 22, 1998, is illustrated in FIG. 3 and generally identified with the reference numeral 200. The arbitrary waveform modem 200 includes an arbitrary or chaotic waveform generator or modulator portion 202 and a chaotic waveform receiver or demodulator portion 204, configured as a sliding window correlator. The modulator portion 202 and the demodulator portion may be identical and may be operated in a half duplex made in order to reduce hardware. As will be discussed below, the modulator portion 202 can be configured to generate an RF or an optical output, generally indicated with the reference numeral 206. On the same token, the receiver or modulator portion 204 is adapted to receive either a modulated optical or an RF modulated waveform 206. The modulator portion 202 is configured as an arbitrary waveform generator and is adapted to generate any waveform including a non-periodic or arbitrary waveform as illustrated with the reference 206 and even periodic waveform. As shown, the modulator portion 202 may include a finite impulse response (FIR) filter 208 with a plurality of variable time delay tapped delay lines, generally indicated with the reference numeral 210. The shape of the waveform generated by the arbitrary waveform modem 200 is a function of the tap weights W1 . . . WN applied to the tapped delay lines 210 which, in turn, allows a modulator portion 202 to generate arbitrary or chaotic waveforms, such as the waveform illustrated with the reference numeral 206. Depending on the tap weights, the modulator portion 202 may also be used to generate periodic waveforms. As shown, the tapped delay lines 210 are formed from fiber optics with non-uniform spaced Bragg gratings. As discussed above, such Bragg gratings may be formed from a series of photo induced refractive index perturbations in an optical fiber which causes the reflection of optical signals within a selective wavelength band. The grating wavelength of maximal reflectivity is selected for each one of the incident optical inputs from a plurality of different lengths which enable the modulator portion 202 to generate virtually any waveform including a chaotic or arbitrary waveform as indicated with the reference numeral 206. In order to control drifting of the tap weights, W1 . . . WN, for example, due to temperature drift, the tap weights W1 . . . WN may be controlled by the servo control loop as discussed in commonly owned U.S. Pat. No. 6,167,024, hereby incorporated by reference. By preventing the tap weights W1 . . . WN from drifting, the modem 200 is able to generate any arbitrary or chaotic waveform 206, while minimizing if not eliminating any phase noise resulting from temperature drift of the tapped delay lines.

The modulator portion 202 and the demodulator portion 204 are configured as a sliding window correlator. The demodulator portion includes a matched filter portion 212. The matched filter portion 212 may be a FIR filter which includes a plurality of tapped delay lines 212 formed from fiber optics with non-uniform spaced Bragg gratings. In order to form a matched filter, the tapped delay lines 212 are formed as a mirror image of the tapped delay lines 210 which form part of the FIR filter 208 in the modulator portion 202. The tapped delay lines in both the modulator portion 202 and the demodulator portion 204 are generally identical. The mirrored or reflexive tap assignment of the demodulator portion 204 provides for proper timing of the signals from the modulator portion 202 to the demodulator portion 204. In particular, the first and shortest signal from the modulator portion 202 from the tapped delay line corresponding to the weight W1 is correlated with the longest tapped delay line in the demodulator portion 204, and assigned the same tap weight W1. The rest of the tapped lines in the modulator portion 202 are similarly correlated to the tapped delay lines in the demodulator portion 204, so that the signals generated by the demodulator portion 202 are in the proper time sequence.

Figure 1:
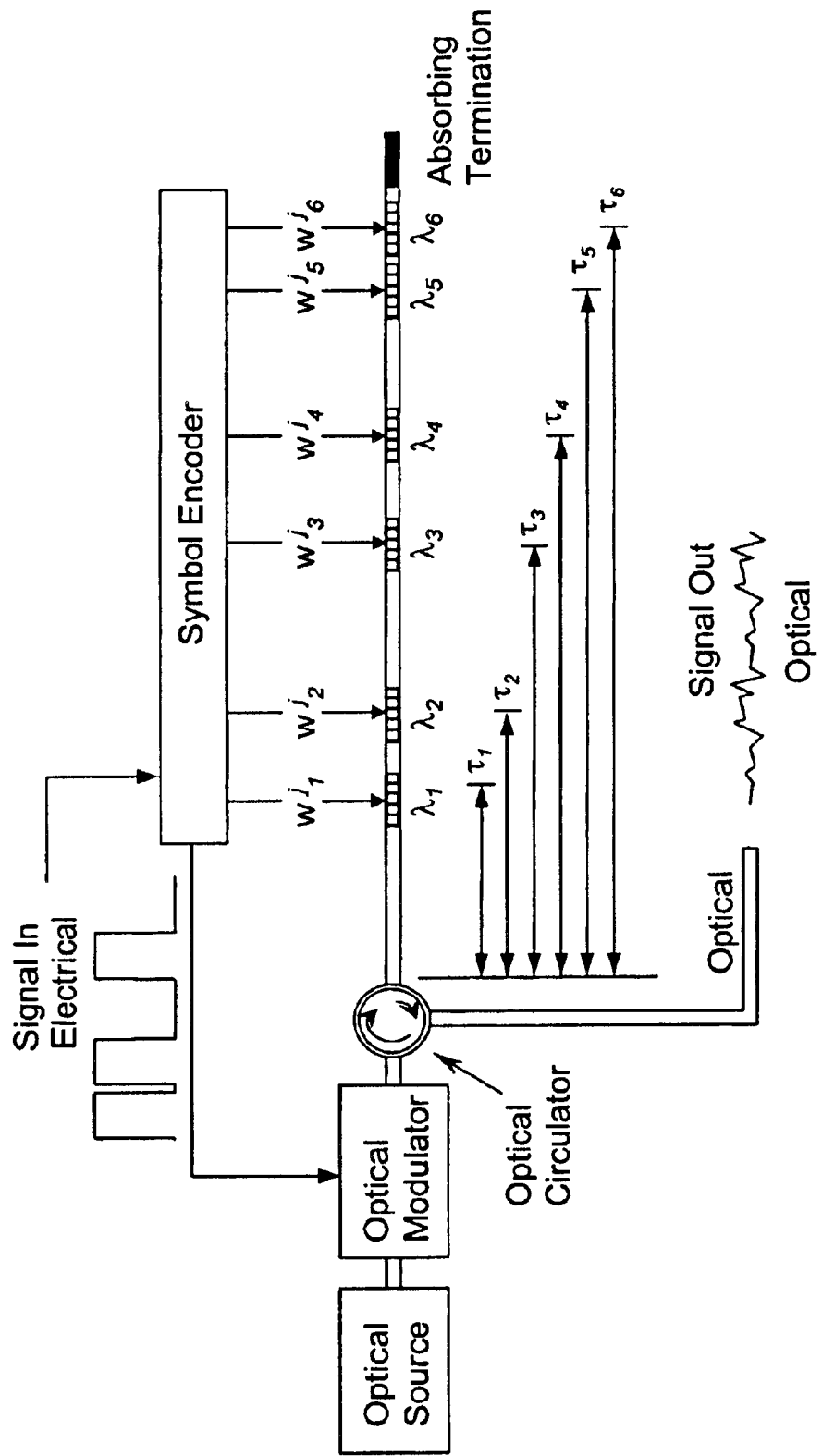
FIG. 1 is a simplified diagram of a known arbitrary waveform modem transmitter for use with the present invention.
Figure 2:
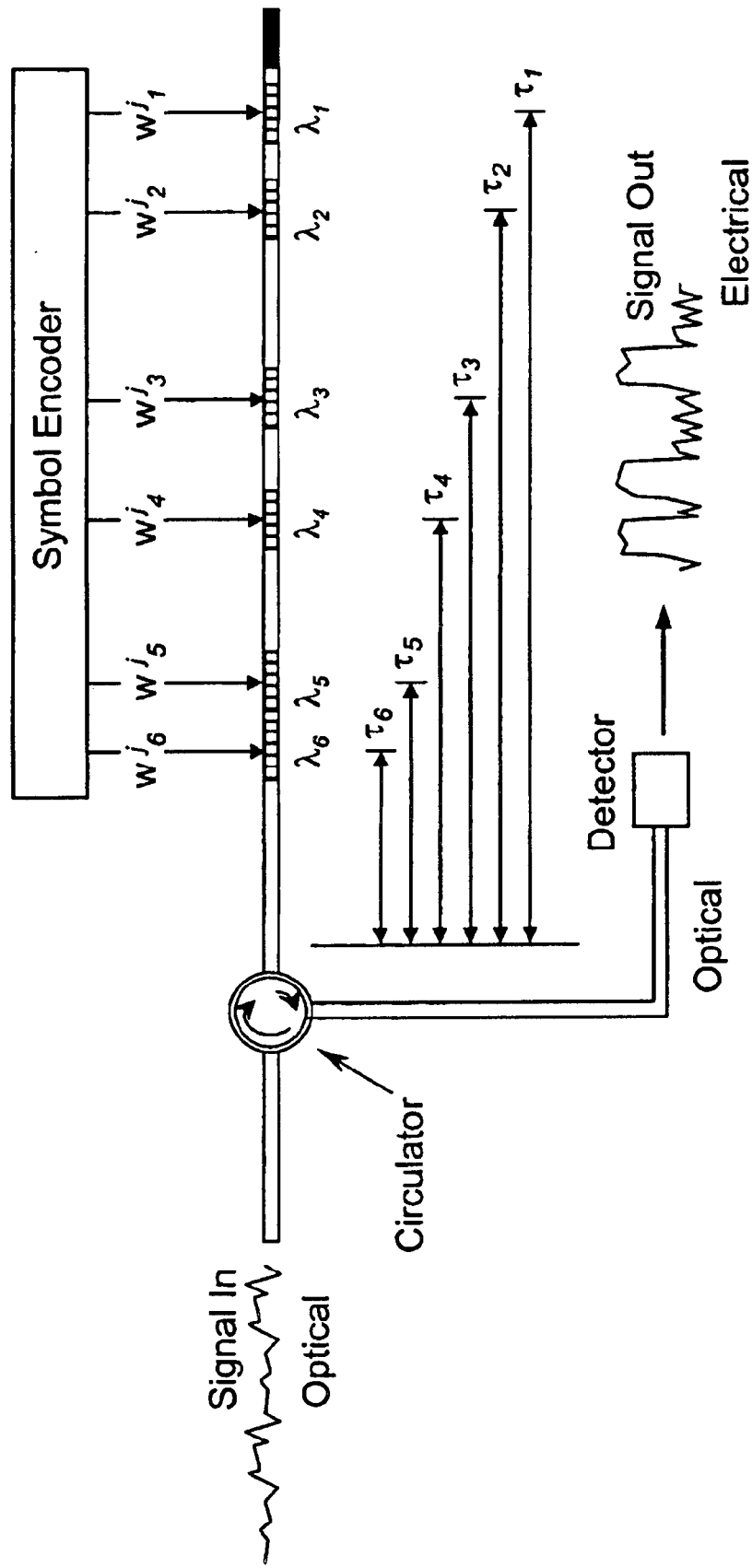
FIG. 2 is a simplified diagram of a known arbitrary waveform modem receiver for use with the present invention.

The data input signal is applied to the modulator portion 202. The data input may be a digital data word, for example, in the form of a mark space modulated signal. The data input is applied to a symbol encoder 214 in which the data input is translated to set of tap weights, W1–W1$_c$. As discussed in commonly owned U.S. Pat. No. 6,167,024, these tap weights may be tracked by a servo control loop as discussed and illustrated in FIGS. 1–5 of the '024 patent. In particular, each of the tap weights W1 . . . W1$_c$ may be applied to individual servo control loops as illustrated in FIG. 1 of the '024 patent. As discussed above, each of the servo loops generates a servoed tap weight signal, identified with the reference numeral 36 in FIG. 1 in the '024 patent, which compensates for temperature drift in the tapped delay lines. This signal 36 may then be applied as the tap weight signals W1 . . . W1$_c$ in the modulator portion 202 as well as the demodulator portion 204.

Upon receipt of the data input, the symbol encoder 214 triggers an impulse generator 216 which modulates light from an optical source 218, such as a semiconductor laser or fiber optic laser through an optical modulator 220. In other words, an optical impulse is created at the output of the optical modulator 220.

The impulse generator 216 may be, for example, a Schmidt trigger, which generates a pulse when triggered by the symbol encoder 214 upon receipt of a data input signal. The optical modulator 220 may be a Mach-Zehnder optical modulator, which are well known in the art. The optical source 218 may be virtually any optical source including a laser, for example, a fiber optic or semiconductor laser which generates either single or multiple wavelength components as discussed below.

The light impulse at the output of the optical modulator 220 is applied to an optical circulator 222 which initially directs the light impulse to a splitter/summer 224. The splitter/summer 224 splits the light signal into a number of channels corresponding to the number of tapped delay lines W1 . . . WN. The channelized signals are directed to the various tapped delay lines 210 and reflected back to the splitter/summer 224 after the appropriate time delay by the tapped delay lines 210. The reflected signals from the splitter/summer 224 are reflected back to the optical circulator 222 to form the arbitrary waveform 206. Suitable splitter/summers and optical circulators are well known in the art.

The waveform 206 may be transmitted as either an optical or an RF waveform. In embodiments where the waveform 206 is transmitted as an RF waveform, the output from the optical circulator 222 is applied to an optical demodulator 225 which demodulates the RF signal from the optical signal. In such an application, the RF signal is transmitted to the demodulator portion 212, where it is received by an optical remodulator or modulator 226. The remodulator or modulator 226 may be similar to the optical modulator 220 and formed from a Mach-Zehnder type modulator as discussed above. The optical demodulator 225 may be a commonly known optical detector, such a photodetector or photodiode.

As discussed above, the demodulator portion 204 includes a matched filter 212, such as a FIR filter, which includes a plurality of tapped delay lines 213. The tapped delay lines 213 in the demodulator portion 204 are identical to the tapped delay lines 210 in the modulator portion 202; the only difference being is that the weights W1–WN are applied in the opposite order as discussed above.

The modulated waveform 206 is received by an optical circulator 228. The optical circulator 206 directs the modulated waveform 206 to a splitter summer 229. The splitter/summer 229, the same as the splitter summer 224, is coupled to a plurality tapped delay lines 213 having the weights assigned in the opposite order than the filter 208, as discussed above. The splitter/summer 229 splits the modulated signal up into a plurality of channels which are, in turn, directed to each of the tapped delay lines 213 and reflected back to the splitter/summer 229 and, in turn, to the optical circulator 228. As discussed above, this configuration forms a sliding window correlator. The signals reflected back to the splitter summer 228 are directed to an optical detector 230 which, as discussed above, may be a photodiode. The output from the photodiode is the recovered data output signal 232. The output of the optical detector 230 is also directed to a symbol recovery block 232 which may be a phase locked loop and directed to a symbol encoder 234, similar to the symbol encoder 214. As discussed above, the symbol encoder 234 is used to provide the tap weights W1 . . . WN to the tapped delay lines 213 as discussed above. The symbol recovery block 232 recovers the tap weights in digital form, which, in turn, are applied to the symbol encoder 234 for assigning the various tap weights W1 . . . WN to the tap delay lines 213.

Bipolar Photonic Arbitrary Waveform Modem

Figure 4:
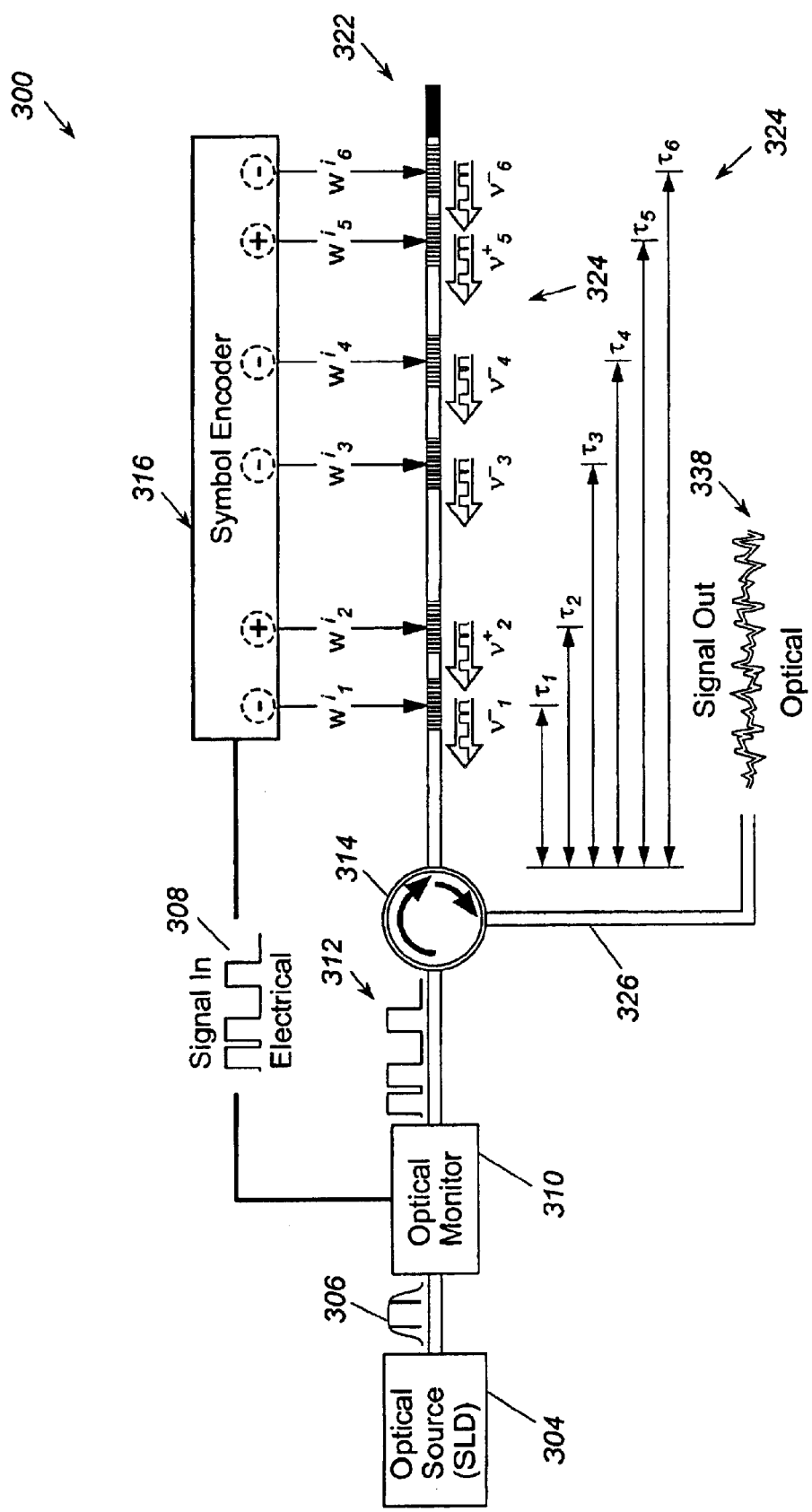
FIG. 4 is a block diagram of a bipolar arbitrary waveform transmitter in accordance with the present invention.
Figure 5:
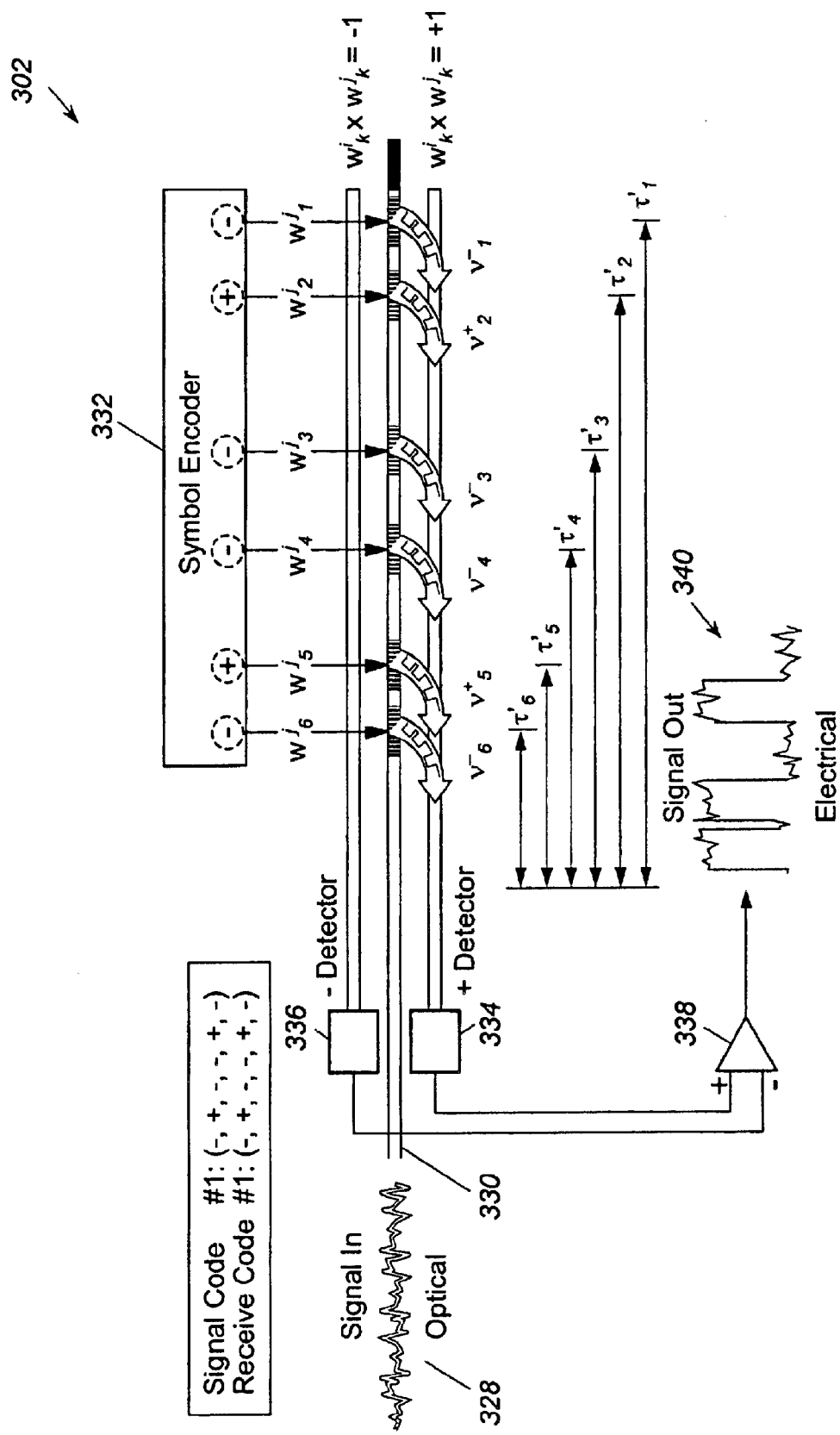
FIG. 5 is a block diagram of a bipolar arbitrary waveform receiver in accordance with the present invention shown implemented with matched transmit/receive codes.
Figure 6:
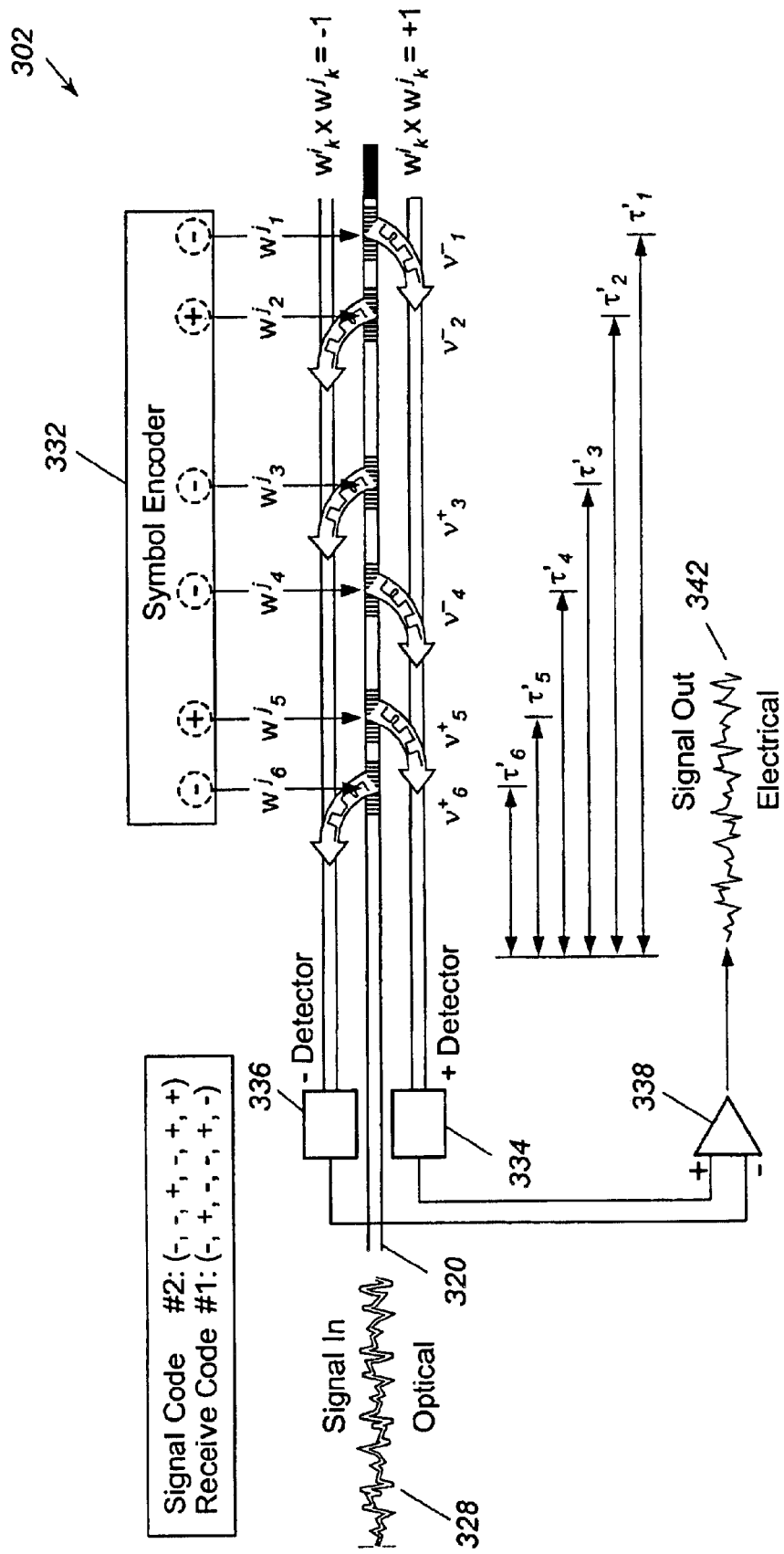
FIG. 6 is similar to FIG. 5 except with unmatched transmit/receive codes.
Figure 7B:
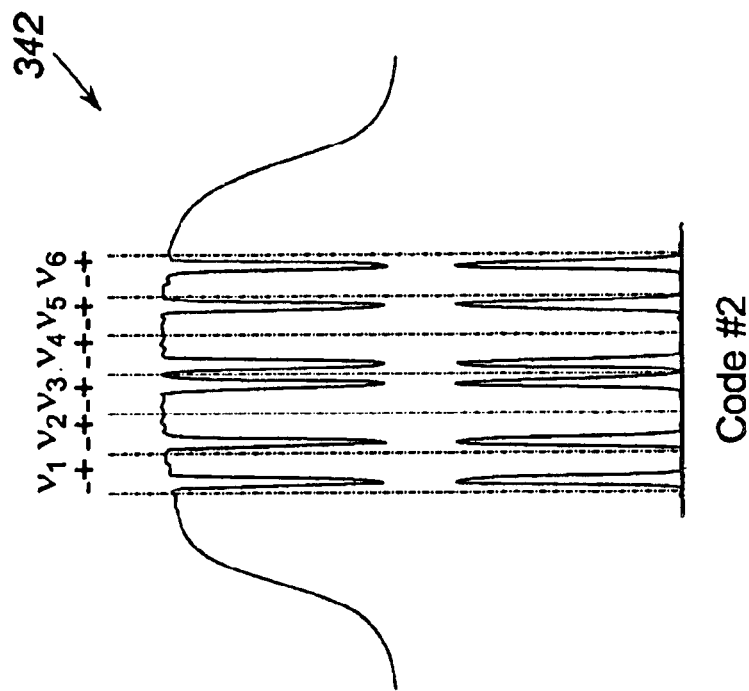
FIGS. 7A and 7B are exemplary six (6) chip bipolar codes obtained by partitioning the optical spectrum of a superluminescent diode.
Figure 7A:
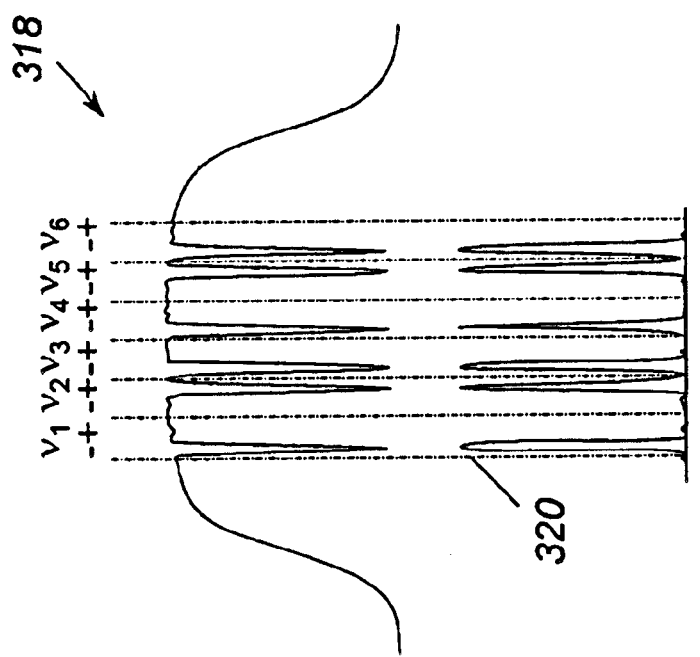

The bipolar arbitrary waveform modem in accordance with the present invention is illustrated in FIGS. 4–6 and includes a bipolar arbitrary waveform modem transmitter 300 and a bipolar arbitrary waveform modem receiver 302. FIG. 5 illustrates a receiver application where the transmit and receive codes are matched while FIG. 6 illustrates a receiver application where the transmit and receive codes are unmatched. None of the embodiments utilize a splitter/summer as in unipolar embodiment to eliminate the losses associated therewith to improve the performance of the device, and specifically the signal-to-noise ratio at the output.

The bipolar arbitrary waveform 300 transmitter and receiver 302 provide the ability to select infinitely variable tap spacings through the use of fiber optics and Bragg grating reflection filters. The generation of an arbitrary waveform with relatively long symbol times, relatively large bandwidths and non-uniform tap spacing is possible. Therefore, the waveform can be any shape necessary. Because the bipolar arbitrary waveform modem can generate non-uniform tap spacing, the phasing of the chip, baud or symbol can be arbitrarily set to any value to produce a waveform characteristic that degenerates the rate line spectral components making interception improbable if not impossible. Additional, co-channel interference is also reduced because the cross-correlation between orthogonally selected waveforms diminishes.

The overall effectiveness of the arbitrary waveform modem is enhanced using a bipolar coding scheme. In such a scheme, the tap weights take on the values of +1 or −1 making it possible to construct truly orthogonal codes. As the number of taps increases, code words become random, noise-like sequences with auto correlation values equal to the number of taps and cross-correlation values that approach zero. The bipolar coding scheme is implemented by impressing a polarity (i.e. sign) on each frequency chip, either positive or negative, which is representative of the tap weight.

Referring to FIG. 4, the bipolar arbitrary waveform modem transmitter 300 includes an optical source 304, for example, a broadband super-luminescent diode (SLD) source 304, which generates a broadband optical carrier signal 306. The broadband optical carrier signal 306 is modulated with a signal waveform 308 by way of an optical modulator 310. The optical modulator 310 may be, for example, a Mach-Zehnder modulator, and produces an optically modulated signal 312, which, in turn, is applied to an optical circulator 314. Such devices are well known in the art.

A symbol encoder 316 encodes the signal waveform 308 with a bipolar encoding scheme in accordance with the present invention. The symbol encoder 316 may include an encoder, pseudo-random sequence generator, Walsh generator and a pair of exclusive OR gates for generating orthogonal Walsh codes, as generally described in U.S. Pat. No. 6,185,246, hereby incorporated by reference. The symbol encoder generates a transmit code vector comprising the set of tap weights $w^i_n$, where i indicates a particular code vector that is a member of a code set and n indicates the number of the optical frequency chips in the particular code set. As described and illustrated only six (6) optical frequency chips are illustrated but in practice the number of optical frequency chips can be in the order of 100. The optical frequency assignments for an exemplary code is illustrated in FIG. 7A and generally identified with the reference numeral 318. The code 318 is divided into a number of segments 320 equal to the number of optical frequency chips employed in the particular code set. As mentioned above, for illustration and discussion purposes, a fixed bit code set is illustrated and thus the exemplary code 318 is divided into six segments 320. In accordance with an important aspect of the invention, each of the segments 320 is subdivided into two subsegments corresponding to $v^-_n$ and $v^+_n$.

The transmit code vector comprising tap weights $w^i_1$ through $w^i_6$ is applied to a filter 322 which includes a plurality of optical delay lines, generally indicated by the reference 324, formed from a combination of fiber optics and non-uniform spaced Bragg reflection gratings to provide a plurality of non-uniform delays illustrated as $\tau_1$–$\tau_6$. Assuming the tap weights are either +1 or −1, the transmit code vector illustrated in FIG. 4 is simply (−, +, −, −, + and −), which results in the reflection of optical frequencies $v^-_1, v^+_2, v^-_3, v^-_4, v^+_5, v^-_6$.

The signal-modulated optical energy 312 is applied to the optical delay lines 322 by way of the optical circulator 314 and reflected back to the optical circulator 314 after the appropriate time delay and an output port 326 to form an arbitrary waveform transmission signal 328. As mentioned above, the optical frequency chips are partitioned into subsegments identified to $v^-_n$ and $v^+_n$. The transmitter 300 is configured to select the minus $v^-_n$ or plus $v^+_n$ frequency for each chip by simply tuning the reflection band for that chip's Bragg grating. This can accomplished in a number of different ways. For example, a Bragg filter can be fabricated as a fixed period grating on a channel waveguide on an electro-optic substrate or on an amorphous substrate with a deposited electro-optic overlay, for example, as disclosed in U.S. Pat. Nos. 5,717,798 and 5,740,292 and "Tuneable Electro-Optic Waveguide TE-TM Converter/Wavelength Filter", by Alferness et al., *Appl. Phys. Lett*, 40, pages 861–862, May 15, 1982, all hereby incorporated by reference. The present invention is unique in the use of electro-optic effect to invert the waveguide mode structure, thereby directing or switching, light of a particular wavelength or optical frequency that is initially in an input waveguide to a preselected one of two possible output waveguides. By applying an appropriate electrical field, the optical propagation constant in the area of the grating is altered thus changing the center frequency of the reflection band.

A receiver for detecting for demodulating the arbitrary waveforms 328 is illustrated in FIG. 5 for matched transmit and receive codes. An illustration of an arbitrary waveform modem receiver for unmatched transmit and receive codes is illustrated in FIG. 6. In both cases the tap weights for the transmitted chips are multiplied by the corresponding tap weights for the receive code. Referring to FIGS. 5 and 6, the optical receiver 302 includes a waveguide 330 for receiving the arbitrary waveform 328 from the arbitrary waveform transmitter 300. The arbitrary waveform receiver 302 includes a symbol encoder 332 for encoding a receive code and a set of appropriate optical delay lines that are complementary to the transmitter optical delay lines. That is to say that the sum of the delays experienced by each of the chips in the transmitter and receiver is made to be identical for all of the chips.

The tap weights for each of the chips of the transmit code are multiplied by the corresponding tap weights of the receive code. If the result is +1, the optical energy is routed to a (+) detector 334, where all time coincident +1 chips are summed. If the result is −1, the optical energy is routed to a (−) detector 226, where all time coincident −1 chips are summed. The outputs of the detectors 334 and 336 are differenced by way of a difference amplifier 338 which generates an output signal 340, which is a replica of the transmitted signal 308 whose amplitude is proportional to the correlation between the transmit code vector $w^i$ and receive code $w^j$ as generally illustrated by equation (1) below.

$$Sig_{out} = Sig_{in} \sum_k w^i_k w^j_k + \text{noise} \tag{1}$$

As shown in FIG. 5, for the case where the transmit code vector $w^i$ and receive code vector $w^j$ are identical as shown, the products of each of the chips is positive. Thus, all of the chips are directed to the (+) detector 334. On the other hand, if an orthogonal code, for example, the code 342 as illustrated in FIG. 7B, is utilized for the receive code vector $w^j$, the result is as shown in FIG. 6. In this application, the result of the multiplication of the chips for some of the tap weights is minus, therefore, these chips are applied to the (−) detector 336 and differenced by the difference amplifier 338 to provide an output signal 342 which is essentially zero.

Figure 8A:
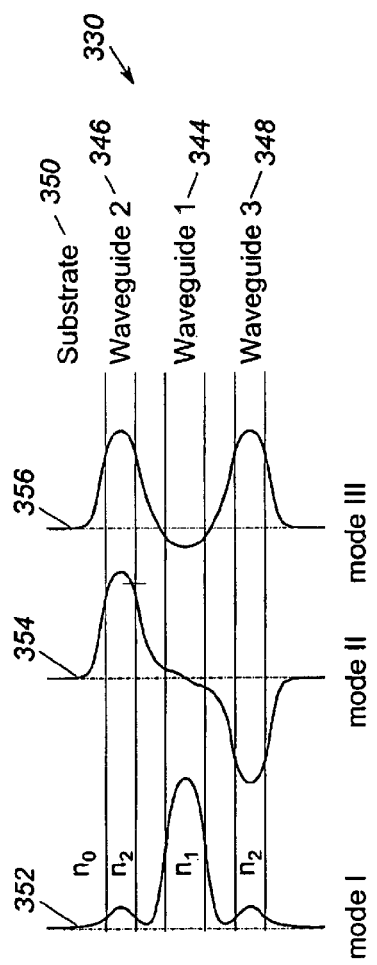
FIG. 8A is an elevational view of a basic waveguide structure for use with the present invention illustrating the mode profiles.
Figure 8B:
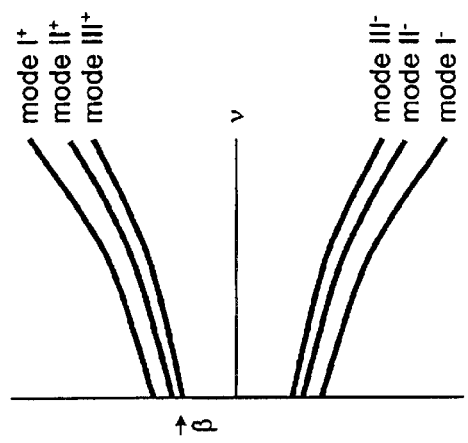
FIG. 8B is a dispersion diagram of the optical propagation constant β for the structure illustrated in FIG. 8A.

The receiver 302 is relatively more complicated than the transmitter 300 since it must direct the − or + frequency to one of two identical receive optical delay lines, depending on the receive tap weight. This function may be implemented by a three waveguide structure, as generally illustrated in FIG. 8A and identified with the reference numeral 330. The waveguide 330 is configured with three waveguide layers 334, 346 and 348 forming waveguides 1, 2 and 3, respectively, on a substrate 350, for example a silicon dioxide layer formed on the surface of a silicon substrate by an oxidation process that is common in the semiconductor industry. The substrate 350 is selected with an index of refraction is of $n_0$, while waveguide 1 (344) is formed with a index of refraction of $n_1$. The waveguides 2 and 3 (346 and 348) are formed with an index of refraction of the $n_2$. The three waveguide structure 330 is formed such that it follows a relationship where $n_1 > n_2 > n_0$.

Figure 9A:
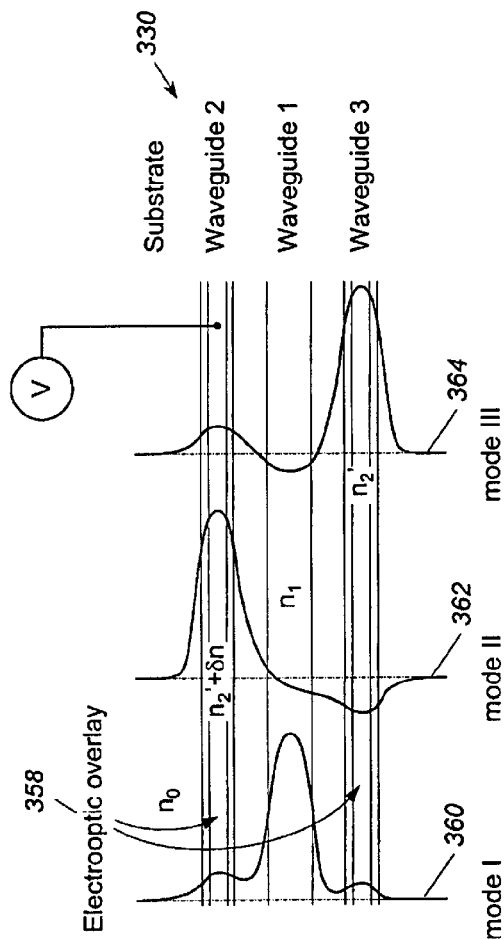
FIG. 9A is a further development of FIG. 8A the structure shown illustrated shown with an electro-optic overlay.
Figure 9B:
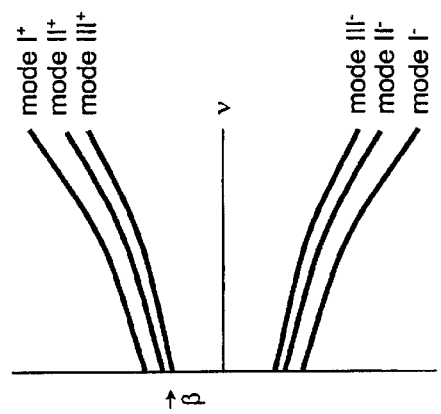
FIG. 9B is a dispersion diagram for the structure illustrated in FIG. 9A.

Exemplary mode field profiles 352, 354 and 356 are shown for the lowest order mode I and the next two higher order modes II and III. A dispersion diagram is illustrated in FIG. 10B which illustrates the optical propagation constant for each of the forward propagating (i.e. left to right) modes I⁺, II⁺ and III⁺ and the backward propagating modes I⁻, II⁻ and III⁻ as a function of optical frequencies v. By placing an electro-optic overlay, generally identified with the reference numeral 358 (or some other means to externally alter the waveguide's refractive indices) on the waveguides 2 and 3 (346 and 348) as shown in FIG. 9A, an asymmetry can be introduced which results in the propagation of the three modes 360, 362, 364 illustrated in FIG. 9A. As shown in FIG. 9A, for the case where a voltage is applied that causes an increase in the refractive index of waveguide 2 (346), the energy of mode II is predominantly in waveguide 2 (346) and the energy of mode III is predominantly in waveguide 3 (348). If a voltage is applied to increase the refractive index of waveguide 3 (348), the modal distributions are reversed. A dispersion diagram for the optical waveguide illustrated in FIG. 9A is shown in FIG. 9B.

If a grating is disposed on the waveguides illustrated in FIG. 9A, the forward propagating light in mode I can be coupled to backward propagating modes II and III only at those optical frequencies that satisfy the grating in phase matching condition given by equation (2).

$$|\beta^{+}{}_{I}| + |\beta^{-}{}_{II,III}| = K_G \quad (2)$$

where $\beta$ is the propagation constant for a particular mode and $K_G$ is the grating constant given by $K_G = 2\pi/\Lambda_G$, where $\Lambda_G$ is the grating period.

Figure 10A:
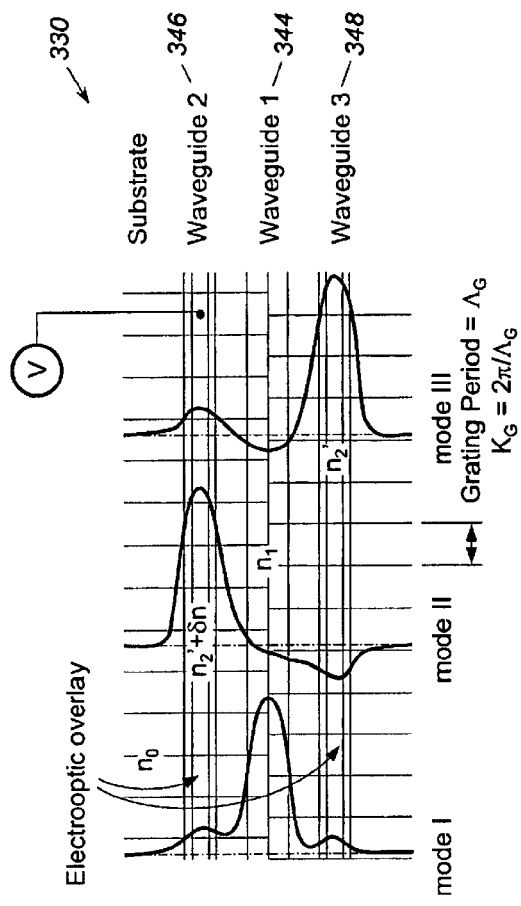
FIG. 10A is a further development of the structure illustrated in 8B but with Bragg gratings formed thereon.
Figure 10B:
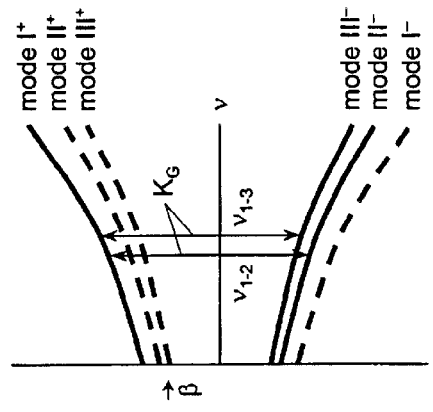
FIG. 10B is a dispersion diagram for the structure illustrated in FIG. 10A.

Referring to FIG. 10A, the waveguide 1 (344) corresponds to the main receive waveguide while waveguides 2 and 3 (346 and 348) correspond to the negative product and positive product waveguides, respectively. The receive tap weight is set to a value of (+) by applying a voltage to the waveguide 2 (346) as shown in FIG. 10A. Thus, light incident on the grating at a frequency $v^+$ corresponding to $v_{1-3}$ will be transferred to mode III predominantly in waveguide 3 and light at a frequency at $v^-$ corresponding to $v_{1-2}$ will be transferred to mode II predominantly in waveguide 2 (346). In order assign a value of (−) to the tap weight, a voltage is applied to waveguide 3 (348). In this case, light at the frequency $v^+$ transfers to mode III which is now predominantly in waveguide 2 and light at $v^-$ transfers to mode II which is now predominantly in waveguide 3.

The waveguide 330 may be formed as a semiconductor waveguide or as a dielectric waveguide. The fabrication of semiconductor waveguides is relatively well known in the art as set forth in U.S. Pat. Nos. 5,416,884; 5,678,935; 5,841,930; 5,891,748 and 5,917,981, hereby incorporated by reference. Further the fabrication of dielectric waveguides is relatively well known in the art as set forth in U.S. Pat. Nos. 3,659,916; 4,111,523; 4,284,663; 5,613,995 and 6,054,253, hereby incorporated by reference. An example embodiment of the present invention would comprise a highly polished silicon wafer, upon which has been grown a 15 $\mu$m thick layer of silicon dioxide ($SiO_2$) by the technique of thermal oxidization. The optical waveguides can be fabricated on the surface of the $SiO_2$ by using chemical vapor deposition of doped $SiO_2$ and RF sputtering techniques as set forth in R. L. Davis and S. H. Lee, "Low-loss waveguides on silicon substrates for photonic circuits," *Optical Technology for Signal Processing Systems*, Mark P. Bendett, editor, v. 1474, p. 20, SPIE, Orlando, Fla., 1991. Well-known photolithography processes can be used to define the waveguide patterns on the surface of the substrate. Typical cross-section dimensions for the waveguides may be on the order of 4 $\mu$m×4 $\mu$m, the actual sizes will depend on the selection of materials. The electro-optic active overlay can be a sputter-deposited film of zinc oxide (ZnO) as set forth in F. S. Hickernell, "DC triode sputtered zinc oxide surface elastic wave transducers," Journal of Applied Physics, v 44, p. 1061, Mar, 1973. The fixed grating can be etched as a surface relief pattern in the surface of the waveguide structure or it may be generated by introducing a periodic perturbation to the waveguides' refractive indices in a method similar to that used for manufacturing fiber Bragg gratings in optical fibers as set forth in U.S. Pat. No. 4,725,110: "Method for impressing gratings within fiber optics."

Obviously, many modification and variations of the present invention are possible in light of the above teachings. For example, thus, it is to be understood that, within the scope of the appended claims, the invention may be practiced otherwise than as specifically described above.

What is claimed and desired to be secured by Letters Patent of the United States is:

1. An photonic arbitrary waveform mode comprising:

an arbitrary waveform transmitter including an optical modulator, optical source, a first symbol encoder, a plurality of tapped delay lines and an optical circulator, where said symbol encoder configured to encode said waveforms with a first bipolar code to generate a first set of code vectors; and an arbitrary waveform receiver including a waveguide device, a second symbol encoders, a plurality of tapped delay lines, a (+) detector and a (−) detector, said symbol encoder configured to generate a second set of code vectors, said waveguide configured to multiply said first and second codes vectors together and direct the result code to either said (+) detector or said (−) detector as a function of the product.

2. The modem as recited in claim 1, wherein said first code vector is matched to said second code vector.

3. The modem as recited in claim 1, wherein said first code vector is not matched to said second code vector.

\* \* \* \* \*

UNITED STATES PATENT AND TRADEMARK OFFICE
CERTIFICATE OF CORRECTION

PATENT NO. : 6,839,521 B2
DATED : January 4, 2005
INVENTOR(S) : Richard L. Davis It is certified that error appears in the above-identified patent and that said Letters Patent is hereby corrected as shown below:

Column 10,
Line 31, should read as follows:
1.  a photonic arbitrary waveform mode comprising:
Lines 35-37, should read as follows:
wherein said symbol encoder is configured to encode said waveforms with a first bipolar code to generate a first set of code vectors; and
Lines 40-44, should read as follows:
device, a second symbol encoder, a plurality of tapped delay lines, a (+) detector and a (-) detector, said second symbol encoder configured to generate a second set of code vectors, said waveguide configured to multiply said first and second vecotrs together and direct Signed and Sealed this Eighth Day of March, 2005

JON W. DUDAS
*Director of the United States Patent and Trademark Office*